US011447586B2

(12) United States Patent
Keaton et al.

(10) Patent No.: US 11,447,586 B2
(45) Date of Patent: Sep. 20, 2022

(54) OLEFIN POLYMERIZATION ACTIVATORS

(71) Applicant: Dow Global Technologies LLC, Midland, MI (US)

(72) Inventors: Richard J. Keaton, Lake Jackson, TX (US); Rafael Huacuja, Lake Jackson, TX (US); David R. Wilson, Midland, MI (US); Jerzy Klosin, Midland, MI (US); David M. Pearson, Lake Jackson, TX (US); Todd D. Senecal, Midland, MI (US); Sukrit Mukhopadhyay, Midland, MI (US); William H. H. Woodward, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/043,304

(22) PCT Filed: Mar. 26, 2019

(86) PCT No.: PCT/US2019/024034
§ 371 (c)(1),
(2) Date: Sep. 29, 2020

(87) PCT Pub. No.: WO2019/191068
PCT Pub. Date: Oct. 3, 2019

(65) Prior Publication Data
US 2021/0032382 A1 Feb. 4, 2021

Related U.S. Application Data

(60) Provisional application No. 62/650,412, filed on Mar. 30, 2018.

(51) Int. Cl.
| | |
|---|---|
| *B01J 31/38* | (2006.01) |
| *C08F 4/52* | (2006.01) |
| *C08F 4/64* | (2006.01) |
| *C08F 4/76* | (2006.01) |
| *C08F 210/16* | (2006.01) |
| *C08F 4/659* | (2006.01) |

(52) U.S. Cl.
CPC .............. *C08F 210/16* (2013.01); *C08F 4/52* (2013.01); *C08F 4/65908* (2013.01); *B01J 31/38* (2013.01); *C08F 4/64* (2013.01); *C08F 4/659* (2013.01)

(58) Field of Classification Search
CPC .... C08F 10/14; C08F 210/16; C08F 4/64193; C08F 4/6437; C08F 4/659; C08F 4/65908; C08F 2500/02; C08F 2500/03; C08F 4/52
USPC ....................................................... 526/154
See application file for complete search history.

(56) References Cited

U.S. PATENT DOCUMENTS

| | | | |
|---|---|---|---|
| 3,773,733 A | 11/1973 | Matsushima | |
| 3,860,622 A * | 1/1975 | Wade | C07F 5/04 502/171 |
| 4,677,088 A | 6/1987 | Huff et al. | |
| 5,347,024 A | 9/1994 | Nickias et al. | |
| 5,447,895 A | 9/1995 | Marks et al. | |
| 5,536,797 A * | 7/1996 | Nickias | C08F 10/00 502/103 |
| 5,763,549 A | 6/1998 | Elder et al. | |
| 5,807,939 A | 9/1998 | Elder et al. | |
| 5,895,771 A * | 4/1999 | Epstein | B01J 31/2295 502/103 |
| 5,919,983 A | 7/1999 | Rosen et al. | |
| 6,177,376 B1 | 1/2001 | Fritze et al. | |
| 6,221,941 B1 | 4/2001 | Strauss et al. | |
| 6,284,697 B1 * | 9/2001 | Windisch | B01J 31/122 502/154 |
| 6,392,076 B1 * | 5/2002 | Strauss | C07F 5/069 556/40 |
| 6,395,671 B2 | 5/2002 | LaPointe | |
| 6,455,650 B1 * | 9/2002 | Lipian | C08F 32/00 526/284 |
| 6,462,156 B2 | 10/2002 | LaPointe | |
| 6,627,573 B2 | 9/2003 | Babb et al. | |
| 6,777,509 B2 | 8/2004 | Brown et al. | |
| 6,869,904 B2 | 3/2005 | Boussie et al. | |

(Continued)

FOREIGN PATENT DOCUMENTS

| | | | | |
|---|---|---|---|---|
| CN | 102451758 A * | 5/2012 | ............. | B01J 31/22 |
| EP | 707014 A1 | 4/1996 | | |

(Continued)

OTHER PUBLICATIONS

Krossing, I.; Brands, H.; Feuerhake, R.; KKoenig, S. J. Fluorine Chem. 2001, 112, 83-90. (Year: 2001).*
Sun, Y; Metz, M.V.; Stern, C.L.; Marks, T.J. Organometallics 2000, 19, 1625-1627. (Year: 2000).*
Metz, M.V.; Sun, Y.; Stern, C.L.; Marks, T.J. Organometallics 2002, 21, 3691-3702. (Year: 2002).*

(Continued)

*Primary Examiner* — Rip A Lee
(74) *Attorney, Agent, or Firm* — Dinsmore & Shohl LLP

(57) ABSTRACT

Embodiments of this disclosure include processes of polymerizing olefins, the process comprising contacting ethylene and a ($C_3$-$C_{40}$)alpha-olefin comonomer in the presence of a catalyst system, the catalyst system comprising a Group IV metal-ligand complex and an ionic metallic activator complex, the ionic metallic activator complex comprising an anion and a countercation, the anion having a structure according to formula (I):formula (I)

$$[(R-O)_n-M-(X)_{4-n}]^{-1}.$$ (I)

11 Claims, 1 Drawing Sheet

(56) References Cited

U.S. PATENT DOCUMENTS

| | | | |
|---|---|---|---|
| 6,900,321 B2 | 5/2005 | Boussie et al. | |
| 6,953,764 B2 | 10/2005 | Frazier et al. | |
| 7,078,546 B2 | 7/2006 | Piers et al. | |
| 7,511,104 B2 | 3/2009 | Pehlert et al. | |
| 7,579,416 B2 | 8/2009 | Mihan | |
| 7,619,047 B2* | 11/2009 | Yang | C08F 10/00 526/943 |
| 7,650,930 B2 | 1/2010 | Cheluget et al. | |
| 7,683,194 B2* | 3/2010 | Krossing | C07F 5/003 556/14 |
| 8,372,927 B2 | 2/2013 | Figueroa et al. | |
| 9,243,090 B2 | 1/2016 | Arriola et al. | |
| 9,349,895 B2 | 5/2016 | Ikenaga et al. | |
| 9,362,436 B2 | 6/2016 | Nanjundiah et al. | |
| 2004/0162215 A1 | 8/2004 | Vogel | |
| 2007/0149386 A1 | 6/2007 | Mihan | |
| 2008/0249264 A1* | 10/2008 | Hanefeld | C08F 10/10 526/194 |
| 2008/0275189 A1 | 11/2008 | Carnahan et al. | |
| 2008/0311812 A1 | 12/2008 | Arriola et al. | |
| 2009/0209713 A1* | 8/2009 | McGuiness | B01J 31/188 526/154 |
| 2015/0094433 A1 | 4/2015 | Hoang et al. | |
| 2015/0094434 A1 | 4/2015 | Tohi et al. | |
| 2015/0099856 A1 | 4/2015 | Hoang et al. | |
| 2019/0040086 A1* | 2/2019 | Holub | C07C 211/63 |
| 2021/0054119 A1* | 2/2021 | Senecal | C08F 4/64193 |

FOREIGN PATENT DOCUMENTS

| | | | |
|---|---|---|---|
| EP | 824112 A1 | 2/1998 | |
| EP | 856523 A1 | 8/1998 | |
| EP | 573403 B1 | 11/1998 | |
| EP | 1056752 A1 | 12/2000 | |
| EP | 1074555 A2 | 2/2001 | |
| EP | 1308449 A2 | 5/2003 | |
| EP | 2221328 A2 | 8/2010 | |
| EP | 2468758 A2 | 6/2012 | |
| FR | 2942230 A1 | 8/2010 | |
| WO | 9735893 A1 | 10/1997 | |
| WO | 9849212 A1 | 11/1998 | |
| WO | 9906413 A1 | 2/1999 | |
| WO | 9941294 A1 | 8/1999 | |
| WO | 0053611 A1 | 9/2000 | |
| WO | 0063262 A2 | 10/2000 | |
| WO | 0123442 A1 | 4/2001 | |
| WO | 0130785 A1 | 5/2001 | |
| WO | 0158969 A1 | 8/2001 | |
| WO | 03101936 A1 | 12/2003 | |
| WO | 2005054254 A1 | 6/2005 | |
| WO | 2005063829 A1 | 7/2005 | |
| WO | 2007136494 A2 | 11/2007 | |
| WO | 2007136496 A2 | 11/2007 | |
| WO | WO 2008/038173 A2 * | 4/2008 | B01J 31/22 |
| WO | 2010022228 A2 | 2/2010 | |
| WO | WO 2010/139684 A1 * | 12/2010 | B01J 31/34 |
| WO | 2011102989 A1 | 8/2011 | |
| WO | 2014209927 A1 | 12/2014 | |
| WO | 2017173080 A1 | 10/2017 | |

OTHER PUBLICATIONS

McGuiness, D.S.; Rucklidge, A.J.; Tooze, R.P.; Slawin, A.M.Z. Organometallics 2007, 26, 2561-2569. (Year: 2007).*

Arriola et al., "Catalytic Production of Olefin Block Copolymers via Chain Shuttling Polymerization", Science, 2006, 312, 714-719.

Busico, V., "Metal-catalysed olefin polymerisation into the new millennium: a perspective outlook", Dalton Transactions 2009, 8794-8802.

Delferro et al., "Multinuclear Olefin Polymerization Catalysts", Chem. Rev. 2011, 111, 2450-2485.

Galland et al., "13C NMR Determination of the Composition of Linear Low-Density Polyethylene Obtained with [è3-Methallyl-nickel-diimine]PF6 Complex", Macromolecules 1999, 32, 1620-1625.

International Search Report and Written Opinion pertaining to PCT/US2019/023643, dated Jul. 3, 2019.

International Search Report and Written Opinion pertaining to PCT/US2019/024034, dated Jun. 26, 2019.

International Search Report and Written Opinion pertaining to PCT/US2019/024075, dated Jun. 26, 2019.

International Search Report and Written Opinion pertaining to PCT/US2019/024599, dated Jul. 10, 2019.

International Search Report and Written Opinion pertaining to PCT/US2019/024754, dated Jul. 30, 2019.

Jung et al., "Analysis of Chain Branch of Polyolefins by a New Proton NMR Approach", Anal. Chem. 2016, 88, 1516-1520.

Klosin et al., "Development of Group IV Molecular Catalysts for High Temperature Ethylene-α-Olefin Copolymerization Reactions", Acc. Chem. Res. 2015, 48, 2004-2016.

Kraft et al., "Synthesis and Application of Strong Brønsted Acids Generated from the Lewis Acid Al(ORF)3 and an Alcohol", Organometallics 2012, 31 (21), 7485-7491.

Krossing, I., "The Facile Preparation of Weakly Coordinating Anions: Structure and Characterisation of Silverpolyfluoroalkoxyaluminates AgAl(ORF)4, Calculation of the Alkoxide Ion Affinity", Chem. Eur. J. 2001, 7, 490.

Krossing, I., "Chemistry with Weakly-Coordinating Fluorinated Alkoxyaluminate Anions: Gas Phase Cations in Condensed Phases?", Coord. Chem. Rev., 2006, 250, 2721-2744.

Lapointe et al., "New Family of Weakly Coordinating Anions", J. Am. Chem. Soc., 2000, 122, 9560-9561.

Li et al., "Coordination Copolymerization of Severely Encumbered Isoalkenes with Ethylene: Enhanced Enchainment Mediated by Binuclear Catalysts and Cocatalysts", J. Am. Chem. Soc. 2005, 127, 14756-14768.

Li et al., "Nuclearity and cooperativity effects in binuclear catalysts and cocatalysts for olefin polymerization", Proc. Natl. Acad. Sci. U. S. A. 2006, 103, 15295-15302.

Li et al., "Catalyst/Cocatalyst Nuclearity Effects in Single-Site Polymerization. Enhanced Polyethylene Branching and r-Olefin Comonomer Enchainment in Polymerizations Mediated by Binuclear Catalysts and Cocatalysts via a New Enchainment Pathway", J. Am. Chem. Soc. 2002, 124, 12725-12741.

Makio et al., "Fl Catalysts for Olefin Polymerization—A Comprehensive Treatment", Chem. Rev. 2011, 111, 2363-2449.

McGuinness et al., "Cocatalyst Influence in Selective Oligomerization: Effect on Activity, Catalyst Stability, and 1-Hexene/1-Octene Selectivity in the Ethylene Trimerization and Tetramerization Reaction", Organometallics 2007, 26 (10), 2561-2569.

McInnis et al., "Multinuclear Group 4 Catalysis: Olefin Polymerization Pathways Modified by Strong Metal-Metal Cooperative Effects", Acc. Chem. Res. 2014, 47, 2545-2557.

Pangborn et al., "Safe and Convenient Procedure for Solvent Purification", Organometallics 1996, 15 (5), 1518-1520.

Nakazawa et al., "A Synthetic Two-Spin Quantum Bit: g-Engineered Exchange-Coupled Biradical Designed for Controlled-NOT Gate Operations", Angew. Chem., Int. Ed. 2012, 51, 9860-9864.

Strauss et al., "Relative Lewis Basicities of Six Al(ORF)4ÿ Superweak Anions and the Structures of LiAl{OCH(CF3) 2}4 and [1-Et-3-Me-1,3-C3H3N2]-[Li{Al{OCH(CF3)2}4}2]", Chem. Eur. J. 2001, 7, 503.

Strauss et al, "LiAl(OC(Ph)(CF3)2)4: A Hydrocarbon-Soluble Catalyst for Carbon-Carbon Bond-Forming Reactions", Organometallics 1996, 15, 3776.

Sturzel et al., "From Multisite Polymerization Catalysis to Sustainable Materials and All-Polyolefin Composites", Chem. Rev. 2016, 116, 1398-1433.

Sun et al., "Al-, Nb- and Ta-based Perfluoroaryloxide Anions as Cocatalysts for Metallocene-Mediated Ziegler-Natta Olefin Polymerization", Organometallics, 2000, 1625-1627.

Yano et al., "Influence of activators on ethylene polymerization with -diphenylmethylidene-cyclopentadienyl/-fluorenyl/zirconium dichloride catalysts at high temperature", J. Mol. Catal. A: Chem. 1999, 148, 77.

(56) References Cited

OTHER PUBLICATIONS

International Search Report and Written Opinion dated Sep. 13, 2021 pertaining to International application No. PCT/US2021/031233 filed May 7, 2021, 11 pages.
Non-Final Office Action dated Jan. 14, 2022, pertaining to U.S. Appl. No. 17/043,483 22 pages.
European Office Communication pursuant to Article 94(3) EPC dated Jul. 13, 2022 for European Patent Application No. 19716692.9 (5 total pages).

* cited by examiner

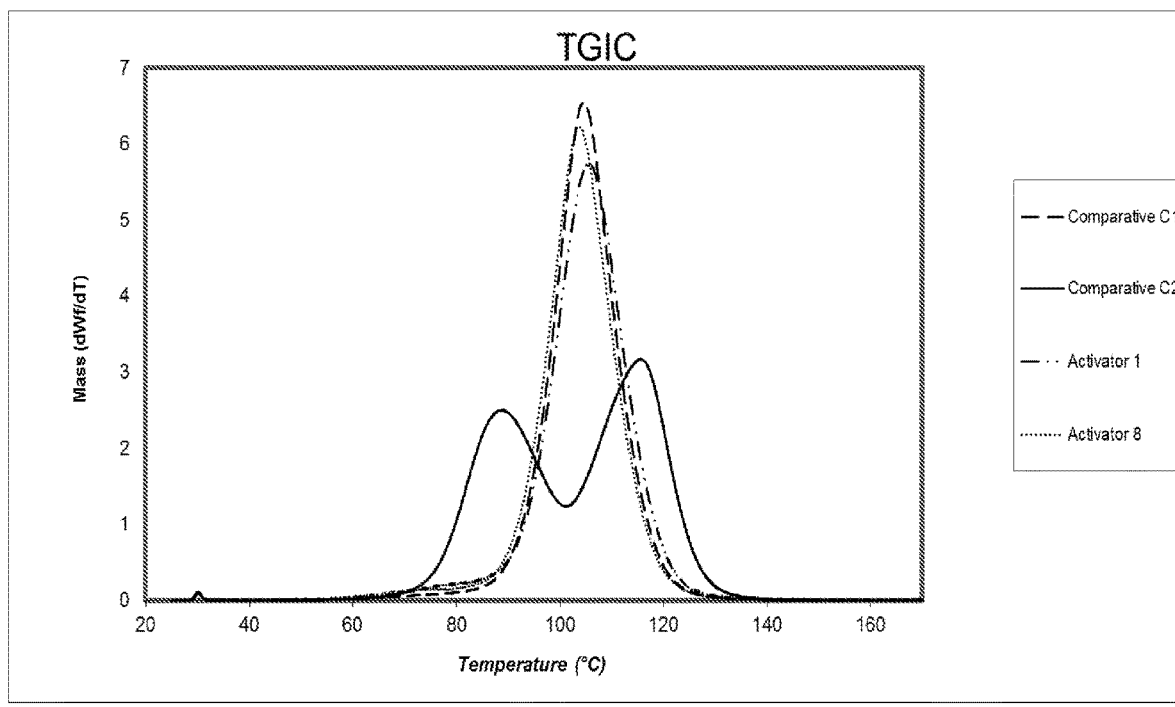

OLEFIN POLYMERIZATION ACTIVATORS

CROSS-REFERENCE TO RELATED APPLICATIONS

This application is a National Stage Entry under 35 U.S.C. § 371 of International Patent Application No. PCT/US2019/024034, filed Mar. 26, 2019, which claims priority to U.S. Provisional Patent Application Ser. No. 62/650,412, filed Mar. 30, 2018, both of which are incorporated by reference herein their entireties.

TECHNICAL FIELD

Embodiments of the present disclosure generally relate to olefin polymerization catalyst systems and processes and, more specifically to olefin polymerization catalyst systems including a group 4 metal-ligand complex and a nuclear activator or co-catalyst.

BACKGROUND

As part of the catalyst composition in α-olefin polymerization reactions, the activator may have characteristics that are beneficial for the production of the α-olefin polymer and for final polymer compositions including the α-olefin polymer. Activator characteristics that increase the production of α-olefin polymers include, but are not limited to: rapid procatalyst activation, high catalyst efficiency, high temperature capability, consistent polymer composition, and selective deactivation.

Olefin-based polymers such as ethylene-based polymer and propylene-based polymers are produced via various catalyst systems. Selection of such catalyst systems can be an important factor contributing to the characteristics and properties of olefin based polymers. The catalyst systems for producing polyethylene-based polymers may include a chromium-based catalyst system, a Ziegler-Natta catalyst system, or a molecular (either metallocene or non-metallocene) catalyst system.

As part of the catalyst system, the molecular polymerization procatalyst is activated to generate the catalytically active species for polymerization, and this can be achieved by any number of means. One such method employs an activator or co-catalyst that is a Brøonsted acid. Brøonsted acid salts containing weakly coordinating anions are commonly utilized to activate molecular polymerization procatalysts, particularly such procatalysts comprising Group IV metal complexes. Brøonsted acid salts that are fully ionized are capable of transferring a proton to form a cationic derivative of such Group IV metal complexes.

For activators such as Brøonsted acid salts, the cationic component may include cations capable of transferring a hydrogen ion such as ammonium, sulfonium, or phosphonium for example; or oxidizing cations such as ferrocenium, silver (I), or lead (II) cations, for example; or highly Lewis acidic cations such as carbonium or silylium, for example.

However, once the cations of the activator or co-catalyst activate the procatalyst, the activators may remain in the polymer composition. As a result, the cations and anions may affect the polymer composition. Since not all ions diffuse equally, different ions affect the polymer composition differently. In particular, the size of the ion and the charge of the ion, the interaction of the ion with the surrounding medium, and the dissociation energy of the ion with available counterions will affect the ion's ability to diffuse through a surrounding medium, such as a solvent, a gel, or a polymer material.

Conventional olefin polymerization activators include weakly-coordinating or non-coordinating anions. It has been shown that weak coordination of the anion leads to increased catalytic efficiency of the cationic catalyst. However, since the non-nucleophilic character of the non-coordinating anion also increases diffusion, the residual activator anion in the produced polymer will lower the electrical resistance of the polymer, thereby increasing electrical loss, and thereby decreasing the applicability of the produced polymer.

SUMMARY

Desirable characteristics of activators in polymer systems include abilities to increase the production of α-olefin polymers, to increase the rate of procatalyst activation, to increase the overall efficiency of the catalyst to enable the catalyst system to operate at high temperatures, to enable the catalyst system to provide consistent polymer composition, and to enable selective deactivation of the activators. Activators derived from the non-coordinating anion tetrakis (pentafluorophenyl)borate ($^-B(C_6F_5)_4$) capture many of these desirable characteristics. Nevertheless, under typical polymerization reaction conditions, the $^-B(C_6F_5)_4$ anion fails to decompose and may remain intact in the final polymer. The presence of an intact activator in the final polymer can be deleterious to the electrical properties of the final polymer.

Activators based on partially hydrolyzed metal trialkyls, such as methylalumoxane (MAO) or modified methylalumoxane (MMAO), for example, decompose more readily than the $^-B(C_6F_5)_4$ anion, but suffer from poor high-temperature catalyst efficiency and broader compositional drift in the final polymer.

There are ongoing needs for activators that efficiently activate a metal-ligand catalyst, that are readily broken down, and that perform well at high temperature. The catalyst systems of this disclosure include, in combination with Group IV metal-ligand complexes, activators or co-catalysts that address such needs. In particular, the activators readily react with and activate the Group IV metal-ligand complexes in the production of polyolefin resins, and the polyolefin resins exhibit useful polymer composition and electrical properties. The activators included in the catalyst systems of this disclosure exhibit characteristics, such as, abilities to increase the production of α-olefin polymers, to increase the rate of procatalyst activation, to increase the overall efficiency of the catalyst to enable the catalyst system to operate at high temperatures, to enable the catalyst system to provide consistent polymer composition, and to enable selective deactivation of the activators.

According to one or more embodiments, a process of polymerizing olefins includes contacting ethylene and a $(C_3-C_{40})$α-olefin comonomer in the presence of a catalyst system that includes a Group IV metal-ligand complex and an ionic metallic activator complex. The ionic metallic activator complex includes an anion and a countercation, the anion having a structure according to formula (I):

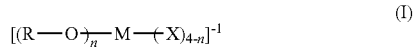

(I)

The countercation is any cation having a formal charge of +1. In formula (I), each M is independently aluminum, boron, or gallium; and n is 2, 3, or 4. Each R is independently selected from the group consisting of radicals having formula (II) and radicals having formula (III):

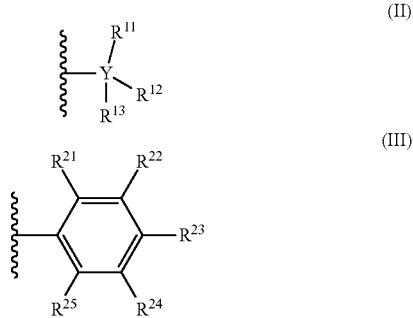

In formulas (II) and (III), each Y is independently carbon or silicon; each instance of $R^{11}$, $R^{12}$, $R^{13}$, $R^{21}$, $R^{22}$, $R^{23}$, $R^{24}$, and $R^{25}$ is independently chosen from $(C_1-C_{40})$alkyl, $(C_6-C_{40})$aryl, —H, —$OR^C$, —O—, or halogen, wherein when R is a radical according to formula (II), at least one of $R^{11}$, $R^{12}$, or $R^{13}$ is a fluorine-substituted $(C_1-C_{40})$alkyl, a halogen-substituted $(C_6-C_{40})$aryl, or —F; and when R is a radical according to formula (III), at least one of $R^{21}$, $R^{22}$, $R^{23}$, $R^{24}$, and $R^{25}$ is a halogen-substituted $(C_1-C_{40})$alkyl, a halogen-substituted $(C_6-C_{40})$aryl, or —F. Furthermore, when M is aluminum and n is 4 and each R is a radical according to formula (II), and Y is carbon, each $R^{11}$, $R^{12}$, and $R^{13}$ of each R is a halogen-substituted $(C_1-C_{40})$alkyl, a halogen-substituted $(C_6-C_{40})$aryl, or —F, the total number of fluorine atoms in $R^{11}$, $R^{12}$, and $R^{13}$ of each R is greater than six. In some embodiments, the countercation may be chosen from tertiary carbocations, alkyl-substituted ammonium ions, anilinium, or ferrocenium.

In formula (I), each X is a monodentate ligand independently chosen from halogen, halogen-substituted $(C_1-C_{20})$alkyl, $(C_1-C_{20})$alkyl, halogen-substituted $(C_6-C_{40})$aryl, $(C_6-C_{40})$aryl, —$S(O)_2CF_3$ or —$S(O)_3OR^C$. Optionally, two R groups in formula (I) are covalently connected. Each $R^C$ is independently $(C_1-C_{30})$hydrocarbyl or —H. In one or more embodiments, the ionic metallic activator complex has a dissipation factor of less than or equal to 0.1 at a concentration of 200 micromoles of ionic metallic activator complex and 20 millimoles of water in a high-boiling-point fully saturated hydrocarbon solution as measured by the Hydrocarbon Conductivity Test.

In some embodiments, the ratio of total number of moles of the one or more metal-ligand complexes in the catalyst system to total number of moles of the one or more ionic metallic activator complexes in the catalyst system is from 1:10,000 to 100:1.

In one or more embodiments, specifically when two R groups are covalently connected, the co-catalyst has a structure according to formula (IV):

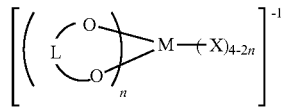

In formula (IV), M and X are as defined in formula (I). The subscript n is 1 or 2. Each L, representing the two covalently connected groups R, is independently chosen from $(C_2-C_{40})$alkylene, or $(C_2-C_{40})$heteroalkylene. When n is 1, X is a monodentate ligand independently chosen from halogen, halogenated-$(C_1-C_{20})$alkyl, $(C_1-C_{20})$alkyl, —$S(O)_3OR^C$, or —$S(O)_2CF_3$ (triflate), wherein $R^C$ is a $(C_1-C_{20})$alkyl.

BRIEF DESCRIPTION OF THE DRAWINGS

The FIGURE is a thermal gradient interaction chromatography (TGIC) spectrum of molecular weight as a function of temperature of two comparative activators and two activators (Activator 1 and Activator 8) that are illustrative embodiments of this disclosure.

DETAILED DESCRIPTION

Specific embodiments of catalyst systems will now be described. It should be understood that the catalyst systems of this disclosure may be embodied in different forms and should not be construed as limited to the specific embodiments set forth in this disclosure.

Common abbreviations are listed below:

R, Y, M, L and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; OTf: triflate; $(^tBu^FO)_3Al$: $Al(OC(CF_3)_3)_3$; THF: tetrahydrofuran; $Et_2O$: diethyl ether; $CH_2Cl_2$: dichloromethane; CV: column volume (used in column chromatography); EtOAc: ethyl acetate; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; N,N'-DMEDA: N,N'-dimethylethylenediamine; $K_3PO_4$: potassium phosphate tribasic; Pd(AmPhos)$Cl_2$: bis(di-tert-butyl(4-dimethylaminophenyl)phosphine)dichloropalladium(II); Pd(dppf)$Cl_2$: [1,1'-bis(diphenylphosphino)ferrocene]palladium(II) dichloride; $K_2CO_3$: potassium carbonate; $Cs_2CO_3$: cesium carbonate; i-PrOBPin: 2-isopropoxy-4,4,5,5-tetramethyl-1,3,2-dioxaborolane; $N_2$: nitrogen gas; PhMe: toluene; PPR: parallel polymerization reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins minutes; h or hrs: hours; d: days; $R_f$: retention fraction; TLC; thin-layer chromatography; rpm: revolutions per minute.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "($C_x$-$C_y$)" means that the unsubstituted form of the chemical group has from x carbon atoms to y carbon atoms, inclusive of x and y. For example, a ($C_1$-$C_{50}$)alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "($C_x$-$C_y$)" parenthetical may contain more than y carbon atoms depending on the identity of any groups $R^S$. For example, a "($C_1$-$C_{50}$)alkyl substituted with exactly one group $R^S$, where $R^S$ is phenyl (—$C_6H_5$)" may contain from 7 to 56 carbon atoms. Thus, in general when a chemical group defined using the "($C_x$-$C_y$)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "—H" means a hydrogen or hydrogen radical that is covalently bonded to another atom. "Hydrogen" and "—H" are interchangeable, and unless clearly specified have identical meanings.

The term "halogen-substituted" means that at least one hydrogen atom (—H) bonded to a carbon atom or heteroatom of a corresponding unsubstituted compound or functional group is replaced by a halogen. The term "halogen-substituted" and "halogenated" are interchangeable. The term "perhalogenated" means that every hydrogen atom (—H) bonded to a carbon atom or heteroatom of a corresponding unsubstituted compound or functional group is replaced by a halogen. The term "halogen-substituted" means that at least one hydrogen atom (—H) bonded to a carbon atom or heteroatom of a corresponding unsubstituted compound or functional group is replaced by a fluorine atom.

In this disclosure, the term "halogen atom" or "halogen" means the radical of a fluorine atom (F) or chlorine atom (Cl). The term "halide" means anionic form of the halogen atom, e.g., fluoride ($F^-$) or chloride ($Cl^-$).

The term "($C_1$-$C_{50}$)hydrocarbyl" means a hydrocarbon radical of from 1 to 50 carbon atoms and the term "($C_1$-$C_{50}$)hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a ($C_1$-$C_{50}$)hydrocarbyl may be an unsubstituted or substituted ($C_1$-$C_{50}$)alkyl, ($C_3$-$C_{50}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene (such as benzyl (—$CH_2$—$C_6H_5$)).

The terms "($C_1$-$C_{50}$)alkyl" and "($C_1$-$C_{18}$)alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted ($C_1$-$C_{50}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" means there is a maximum of 45 carbon atoms in the radical, including substituents, and is, for example, a ($C_{27}$-$C_{40}$)alkyl substituted by one $R^S$, which is a ($C_1$-$C_5$)alkyl, respectively. More broadly, the term "[$C_z$]alkyl" means there is a maximum of z carbon atoms, wherein z is a positive integer, in the radical, including substituents. Each ($C_1$-$C_5$)alkyl may be methyl, trifluoromethyl, ethyl, 1-propyl, 1-methylethyl, or 1,1-dimethylethyl.

The term "($C_6$-$C_{50}$)aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted ($C_6$-$C_{50}$)aryl include: unsubstituted ($C_6$-$C_{20}$)aryl, unsubstituted ($C_6$-$C_{18}$)aryl; 2-($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl include: substituted ($C_1$-$C_{20}$)aryl; substituted ($C_6$-$C_{18}$)aryl; 2,4-bis([$C_{20}$]alkyl)-phenyl; polyfluorophenyl; pentafluorophenyl; fluoren-9-one-1-yl; and biphenyl.

The term "($C_3$-$C_{50}$)cycloalkyl" means a saturated cyclic hydrocarbon radical of from 3 to 50 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples unsubstituted ($C_3$-$C_{40}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, and 1-fluorocyclohexyl.

Examples of ($C_1$-$C_{50}$)hydrocarbylene include unsubstituted or substituted ($C_6$-$C_{50}$)arylene, ($C_3$-$C_{50}$)cycloalkylene, and ($C_1$-$C_{50}$)alkylene (e.g., ($C_1$-$C_{20}$)alkylene). The diradicals may be on the same carbon atom (e.g., —$CH_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradicals. The α,ω-diradical is a diradical that has maximum carbon backbone spacing between the radical carbons. Some examples of ($C_2$-$C_{20}$)alkylene α,ω-diradicals include ethan-1,2-diyl (i.e., —$CH_2CH_2$—), propan-1,3-diyl (i.e., —$CH_2CH_2CH_2$—), 2-methylpropan-1,3-diyl (i.e., —$CH_2CH(CH_3)CH_2$—). Some examples of ($C_6$-$C_{50}$)arylene α,ω-diradicals include phenyl-1,4-diyl, napthalen-2,6-diyl, or napthalen-3,7-diyl.

The term "($C_1$-$C_{50}$)alkylene" means a saturated straight chain or branched chain diradical (i.e., the radicals are not on ring atoms) of from 1 to 50 carbon atoms that is unsubstituted or substituted by one or more $R^S$. Examples of unsubstituted ($C_1$-$C_{50}$)alkylene are unsubstituted ($C_1$-$C_{20}$)alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted (C$_1$-C$_{50}$)alkylene are substituted (C$_1$-C$_{20}$)alkylene, —CF$_2$—, —C(O)—, and —(CH$_2$)$_{14}$C(CH$_3$)$_2$(CH$_2$)$_5$— (i.e., a 6,6-dimethyl-substituted normal-1,20-eicosylene). Since as mentioned previously two R$^S$ may be taken together to form a (C$_1$-C$_{18}$) alkylene, examples of substituted (C$_1$-C$_{50}$)alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "(C$_3$-C$_{50}$)cycloalkylene" means a cyclic diradical (i.e., the radicals are on ring atoms) of from 3 to 50 carbon atoms that is unsubstituted or substituted by one or more R$^S$.

The term "heteroatom," refers to an atom other than hydrogen or carbon. Examples of groups containing one or more than one heteroatom include O, S, S(O), S(O)$_2$, Si(R$^C$)$_2$, P(R$^P$), N(R$^N$), —N=C(R$^C$)$_2$, —Ge(R$^C$)$_2$—, or —Si(R$^C$)—, where each R$^C$ and each R$^P$ is unsubstituted (C$_1$-C$_{18}$)hydrocarbyl or —H, and where each R$^N$ is unsubstituted (C$_1$-C$_{18}$)hydrocarbyl. The term "heterohydrocarbon" refers to a molecule or molecular framework in which one or more carbon atoms of a hydrocarbon are replaced with a heteroatom. The term "(C$_1$-C$_{50}$)heterohydrocarbyl" means a heterohydrocarbon radical of from 1 to 50 carbon atoms, and the term "(C$_1$-C$_{50}$)heterohydrocarbylene" means a heterohydrocarbon diradical of from 1 to 50 carbon atoms. The heterohydrocarbon of the (C$_1$-C$_{50}$)heterohydrocarbyl or the (C$_1$-C$_{50}$)heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical may be on a different heteroatom. Each (C$_1$-C$_{50}$) heterohydrocarbyl and (C$_1$-C$_{50}$)heterohydrocarbylene may be unsubstituted or substituted (by one or more R$^S$), aromatic or non-aromatic, saturated or unsaturated, straight chain or branched chain, cyclic (including mono- and polycyclic, fused and non-fused polycyclic), or acyclic.

The (C$_1$-C$_{50}$)heterohydrocarbyl may be unsubstituted or substituted. Non-limiting examples of the (C$_1$-C$_{50}$)heterohydrocarbyl include (C$_1$-C$_{50}$)heteroalkyl, (C$_1$-C$_{50}$)hydrocarbyl-O—, (C$_1$-C$_{50}$)hydrocarbyl-S—, (C$_1$-C$_{50}$)hydrocarbyl-S(O)—, (C$_1$-C$_{50}$)hydrocarbyl-S(O)$_2$—, (C$_1$-C$_{50}$)hydrocarbyl-Si(R$^C$)$_2$—, (C$_1$-C$_{50}$)hydrocarbyl-N(R$^N$)—, (C$_1$-C$_{50}$) hydrocarbyl-P(R$^P$)—, (C$_2$-C$_{50}$)heterocycloalkyl, (C$_2$-C$_{19}$) heterocycloalkyl-(C$_1$-C$_{20}$)alkylene, (C$_3$-C$_{20}$)cycloalkyl-(C$_1$-C$_{19}$)heteroalkylene, (C$_2$-C$_{19}$)heterocycloalkyl-(C$_1$-C$_{20}$) heteroalkylene, (C$_1$-C$_{50}$)heteroaryl, (C$_1$-C$_{19}$)heteroaryl-(C$_1$-C$_{20}$)alkylene, (C$_6$-C$_{20}$)aryl-(C$_1$-C$_{19}$)heteroalkylene, or (C$_1$-C$_{19}$)heteroaryl-(C$_1$-C$_{20}$)heteroalkylene.

The term "(C$_4$-C$_{50}$)heteroaryl" means an unsubstituted or substituted (by one or more R$^S$) monocyclic, bicyclic, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., (C$_x$-C$_y$)heteroaryl generally, such as (C$_4$-C$_{12}$)heteroaryl) are defined in an analogous manner as having from x to y carbon atoms (such as 4 to 12 carbon atoms) and being unsubstituted or substituted by one or more than one R$^S$. The monocyclic heteroaromatic hydrocarbon radical is a 5-membered ring or a 6-membered ring.

The 5-membered ring monocyclic heteroaromatic hydrocarbon radical has 5 minus h carbon atoms, where h is the number of heteroatoms and may be 1, 2, 3 or 4; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl.

The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl.

The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,6,6-ring system is acrydin-9-yl.

The term "(C$_1$-C$_{50}$)heteroalkyl" means a saturated straight or branched chain radical containing one to fifty carbon atoms, and one or more heteroatom. The term "(C$_1$-C$_{50}$)heteroalkylene" means a saturated straight or branched chain diradical containing from 1 to 50 carbon atoms and one or more than one heteroatom. The heteroatoms of the heteroalkyls or the heteroalkylenes may include Si(R$^C$)$_3$, Ge(R$^C$)$_3$, Si(R$^C$)$_2$, Ge(R$^C$)$_2$, P(R$^P$)$_2$, P(R$^P$), N(R$^N$)$_2$, N(R$^N$), N, O, OR$^C$, S, SR$^C$, S(O), and S(O)$_2$, wherein each of the heteroalkyl, and heteroalkylene groups are unsubstituted or are substituted by one or more R$^S$.

Examples unsubstituted (C$_2$-C$_{40}$)heterocycloalkyl include unsubstituted (C$_2$-C$_{20}$)heterocycloalkyl, unsubstituted (C$_2$-C$_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents R$^S$, one or more double and/or triple bonds optionally may be present in substituents R$^S$. The term "unsaturated" means containing one or more carbon-carbon double bonds or carbon-carbon triple bonds, or (in heteroatom-containing groups) one or more carbon-nitrogen double bonds, carbonphosphorus double bonds, or carbon-silicon double bonds, not including double bonds that may be present in substituents $R^S$, if any, or in aromatic rings or heteroaromatic rings, if any.

Embodiments of this disclosure include processes for polymerizing olefins, the processes include contacting together ethylene, one or more ($C_3$-$C_{40}$)alpha-olefin comonomer, a catalyst, and an ionic metallic activator complex. The ionic metallic activator complex includes an anion and a countercation. The anion has a structure according to formula (I):

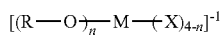

In formula (I), each X is a monodentate ligand independently chosen from halogen, halogen-substituted ($C_1$-$C_{20}$)alkyl, ($C_1$-$C_{20}$)alkyl, halogen-substituted ($C_6$-$C_{40}$)aryl, ($C_6$-$C_{40}$)aryl, or —S(O)$_3$R$^C$.

In formula (I), each M is independently aluminum, boron, or gallium; subscript n is 2, 3, or 4. Each R is independently selected from the group consisting of radicals having formula (II) and radicals having formula (III):

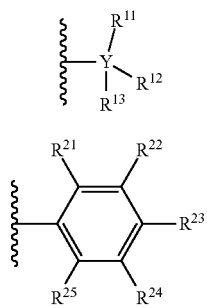

In formula (II), each Y is independently carbon or silicon; each $R^{11}$, $R^{12}$, $R^{13}$, is independently chosen from ($C_1$-$C_{40}$)alkyl, ($C_6$-$C_{40}$)aryl, —H, —NR$^N_2$, —OR$^C$, —SR$^C$, or halogen. In some embodiments of formula (I), when each R is a radical according to formula (II) and Y is carbon, at least one of $R^{11}$, $R^{12}$, or $R^{13}$ is a halogen-substituted ($C_1$-$C_{40}$)alkyl, a halogen-substituted ($C_6$-$C_{40}$)aryl, or —F. In other embodiments of formula (I), when M is aluminum, n is 4, each R is a radical according to formula (II), and each Y is carbon, (1) each $R^{11}$, $R^{12}$, and $R^{13}$ of each R is a halogen-substituted ($C_1$-$C_{40}$)alkyl, a halogen-substituted ($C_6$-$C_{40}$)aryl, or —F; or (2) the total number of fluorine atoms in $R^{11}$, $R^{12}$, and $R^{13}$ of each R is at least six.

In formula (III), each $R^{21}$, $R^{22}$, $R^{23}$, $R^{24}$, and $R^{25}$ is independently chosen from ($C_1$-$C_{40}$)alkyl, ($C_6$-$C_{40}$)aryl, —H, —NR$^N_2$, —OR$^C$, —SR$^C$, or halogen. When R is a radical according to formula (III), at least one of $R^{21}$, $R^{22}$, $R^{23}$, $R^{24}$, or $R^{25}$ is a halogen-substituted ($C_1$-$C_{40}$)alkyl, a halogen-substituted ($C_6$-$C_{40}$)aryl, or —F.

In one or more embodiments of anion of formula (I), subscript n is 4 and each R group is independently —C(H)(CF$_3$)$_2$, —C$_6$F$_5$, or —C(CF$_3$)$_3$. In other embodiments, subscript n is 4, and three of the four R groups are —C(CF$_3$)$_3$ and one of the four R groups is —C$_6$F$_5$. In some embodiments, n is 3 and X is chosen from —OH, triflate (—OTf), methyl, or halogen.

In one or more embodiments of the catalyst system, in the anion of formula (I), two X groups are covalently connected and the anion has a structure according to formula (IV):

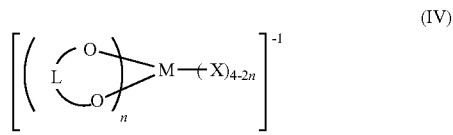

In formula (IV), M and X are as defined in formula (I); subscript n is 1 or 2. L represents the two groups R that are covalently connected; and each L is independently chosen from ($C_2$-$C_{40}$)alkylene, ($C_2$-$C_{40}$)heteroalkylene or —(Si(R$^C$)$_2$—O)$_z$—Si(R$^C$)$_2$—, where subscript z is 0, 1, 2, or 3; and R$^C$ is independently ($C_1$-$C_{30}$)hydrocarbyl or H. In formula (IV), when n is 1, X is a monodentate ligand independently chosen from halogenated-($C_1$-$C_{20}$)alkyl.

In one or more embodiments of the catalyst system including an anion of formula (IV), L is a halogenated biphenyl diradical ion or halogenated naphthalenediyl. The halogenated biphenyl diradical ion may have a single radical on each of the phenyl rings. The diradicals on the halogenated naphthalenediyl may be separated by four or more carbon atoms in the naphthalene.

In one or more embodiments, the ionic metallic activator complex includes the anion according to formulas (I) or (IV) and the countercation having a formal charge of +1. In some embodiments of the metallic ionic complex, the countercation is chosen from a protonated tri[($C_1$-$C_{40}$)hydrocarbyl] ammonium cation. In some embodiments, the countercation is a protonated trialkylammonium cation, containing one or two ($C_{14}$-$C_{20}$)alkyl groups on the ammonium cation. In one or more embodiments, the countercation is $^+$N(CH$_3$)HR$^N_2$, wherein R$^N$ is ($C_{16}$-$C_{18}$)alkyl. In other embodiments, the countercation is $^+$N(H)R$^N_3$, where each R$^N$ is chosen from ($C_1$-$C_{20}$)alkyl or ($C_6$-$C_{20}$)aryl. In one or more embodiments, the countercation is $^+$N(H)R$^N_3$, where at least two R$^N$ are chosen from ($C_{10}$-$C_{20}$)alkyl. In one or more embodiments, the countercation is $^+$N(H)R$^N_3$, wherein R$^N$ is ($C_{16}$-$C_{18}$) alkyl. In some embodiments, the countercation is chosen from methyldi(octadecyl)ammonium cation, methyl(octadecyl)(hexadecyl)ammonium cation, methyldi(hexadecyl) ammonium cation, or methyldi(tetradecyl)ammonium cation. The methyldi(octadecyl)ammonium cation, methyl (octadecyl)(hexadecyl)ammonium cation, methyldi (hexadecyl)ammonium cation, or methyldi(tetradecyl) ammonium cation are collectively referred to herein as armeenium cations. Ionic compounds having armeenium cations are easily formed by protonating (with anhydrous HCl in ether, for example) methyldi(octadecyl)amine, methyl(octadecyl)(hexadecyl)amine, methyldi(hexadecyl)amine, or methyldi(tetradecyl)amine which are available from Akzo-Nobel under the Armeen™ trade names, for example Armeen™ M2HT. In other embodiments, the countercation is triphenylmethyl carbocation ($^+$C(C$_6$H$_5$)$_3$), also referred to as trityl. In one or more embodiments, the countercation is a tris-substituted-triphenylmethyl carbocation, such as $^+$C(C$_6$H$_4$R$^C$)$_3$, wherein each R$^C$ is independently chosen from ($C_1$-$C_{30}$)alkyl. In other embodiments, the countercation is chosen from anilinium, ferrocenium, or aluminocenium. Anilinium cations are protonated nitrogen cations, such as [HN(R$^S$)(R$^N$)$_2$]$^+$, where R$^N$ is ($C_1$-$C_{20}$)alkyl or H and R$^S$ is chosen from ($C_6$-$C_{20}$)aryl, and each alkyl or aryl may be further substituted with —OR$^C$, for example $C_6H_5NMe_2H^+$ or $[H_3N(C_6H_5)]^+$. Aluminoceniums are protonated aluminum cations, such as $R^S{}_2Al(H)(THF)_2{}^+$ or $R^SAl(H)(THF)_2{}^+$, where $R^S$ is chosen from $(C_1-C_{30})$alkyl.

In one or more embodiments, the ionic metallic activator complex in a high-boiling-point fully saturated hydrocarbon solution containing a concentration of 200 micromoles of metallic activator complex and 18 millimoles of water in the high-boiling-point fully saturated hydrocarbon has a dissipation factor of less than or equal to 0.1, as measured by the Hydrocarbon Conductivity Test. In some embodiments, the dissipation factor of the metallic activator complex measured in the same manner has a dissipation factor of less than or equal to 0.05, less than or equal to 0.03, or less than or equal to 0.025. The high-boiling-point fully saturated hydrocarbon solution ("hydrocarbon solution") includes a high-boiling-point fully saturated hydrocarbon solvent, water, and the ionic metallic activator complex. The high-boiling point fully saturated hydrocarbon solvent may include a solvent having a boiling point from about 150° C. to about 190° C. Examples of such high-boiling-point fully saturated hydrocarbon solvents include squalane, dodecane, eicosane, or triacontane, for example.

The electrical properties of a polyolefin elastomer produced by a polymerization process according to this disclosure, specifically the polyolefin elastomer produced by the ionic metallic activator complex according to formula (I) may be assessed relative to electrical properties of other polyolefin elastomers by a Hydrocarbon Conductivity (HC) Test. The HC Test simulates differences between the electrical properties of polyolefin elastomers produced by a comparative activator, such as methyldi($(C_{14}-C_{20})$alkyl)ammonium tetrakis(pentafluorophenyl)borate and the ionic metallic activator ionic complexes of this disclosure. In the HC Test, the activator is dissolved in a high-boiling-point fully saturated hydrocarbon solvent at room temperature. (Room temperature is approximately 22.0±2.5° C.)

The HC Test measures a dissipation factor (at 60 Hz) and a conductivity of the hydrocarbon samples. Each of the hydrocarbon samples is measured using a Novocontrol Technologies Broadband Dielectric Spectrometer (Alpha-A) using standard methods. Other than the gentle heating, all sample preparation steps and measurements were performed at room temperature.

To prepare the hydrocarbon samples for the HC Test, an amount of the activator is added to approximately 10 mL of hydrocarbon solvent to create samples having concentration of approximately 200 μM activator in solution. In a water-containing hydrocarbon sample, deionized water is added to obtain a concentration of approximately 20 mM, and an amount of activator is added to obtain a 200 μM activator hydrocarbon solution. All samples are gently heated to 250° C. to remove the water and any residual low-boiling-point solvents. The dissipation factor and conductivity are measured.

The ratio of total number of moles of the one or more Group IV metal-ligand complexes in the catalyst system to total number of moles of the one or more ionic metallic activator complexes in the catalyst system is from 1:10,000 to 100:1.

In illustrative embodiments, the catalyst systems may include an ionic metallic activator complex comprising an anion and a countercation, in which the anion is according to formula (I). The illustrative embodiments include the anionic structure complexed with a countercation as described in this disclosure, and have the following structure:

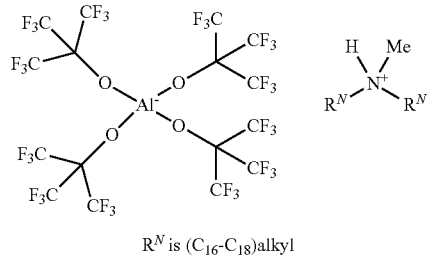

Activator 1

$R^N$ is $(C_{16}-C_{18})$alkyl

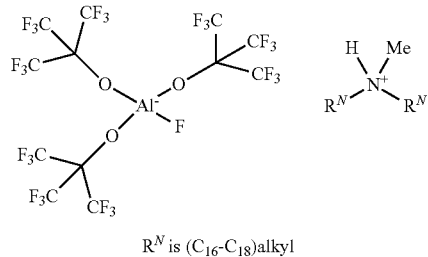

Activator 2

$R^N$ is $(C_{16}-C_{18})$alkyl

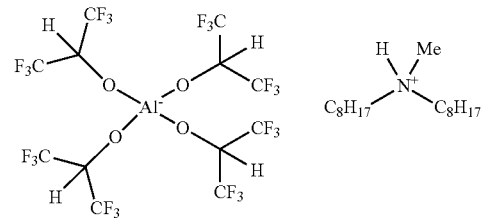

Activator 3

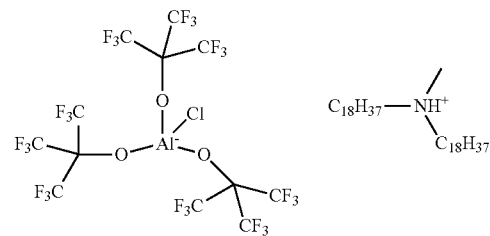

Activator 4

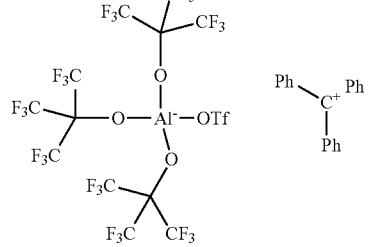

Activator 5

-continued

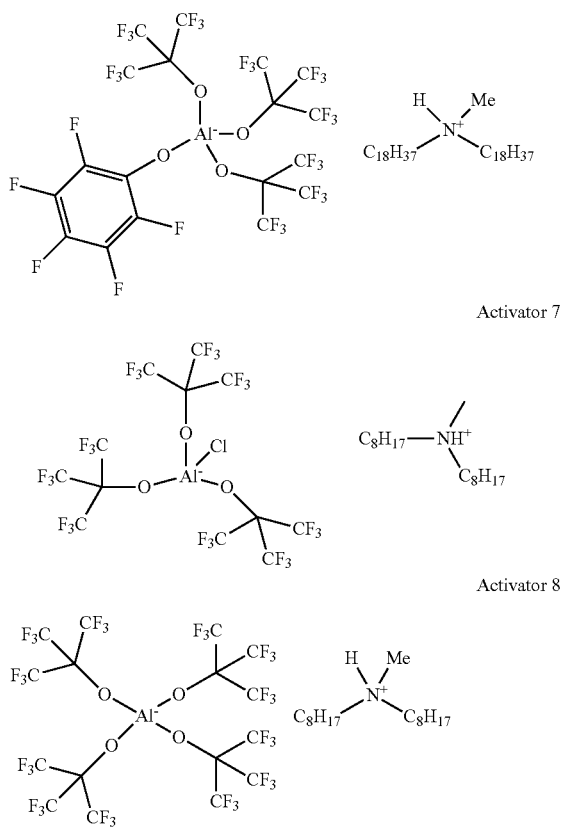

Activator 6

Activator 7

Activator 8

Polymeric Electrical Properties

The electrical insulating efficiency of a medium, such as a polymer material, may be assessed in view of the electrical resistance of the medium and the electrical loss of the medium. Electrical loss lowers the efficiency by which the insulting medium electrically insulates in the presence of an electric field. The resistance of the insulating medium should be as high as possible for both alternating current (AC) and direct current (DC) systems, because the resistance is inversely related to the power or electric loss.

In a DC system such as a photovoltaic device encapsulated in an insulating medium such as polymer material, electric loss manifests as the leakage of current from the encapsulated device through the encapsulant to the external environment. This current (I) is directly related to the voltage (V) of the insulating medium and inversely related to the resistance (R) of the insulating medium according to the equation $I=V \times R^{-1}$. Therefore, the higher the resistance, the lower the current and the current leakage.

In an AC system including an insulating medium such as cable insulation, electric loss manifests as the absorption of energy by the insulating medium in the presence of an electrical field. Measured in power (P), this loss is determined by the equation $P=V^2 \times \omega \times C \times \varepsilon' \times \tan \delta$ where $\omega$ is the angular frequency, $\varepsilon'$ is the relative permittivity, C is the capacitance, and $\tan \delta$ is the dissipation factor, $\tan \delta = (C \times R \times \omega)^{-1}$, resulting in the equation $P=V^2 \times \varepsilon' \times R^{-1}$. Since the resistance is inversely related to the power loss, the higher the resistance, the lower the power loss.

The electrical resistance of a medium is generally decreased as a result of ionic diffusion caused by an external electric field. In a system in which ionic diffusion dominates the electrical response, the resistance is related to the diffusing ions according to the equation $R=6 \times \pi \times \varepsilon' \times \varepsilon_0 \times \eta \times r \times C^{-1} \times q^{-2} \times N^{-1}$ where $\varepsilon_0$ is the permittivity of vacuum ($8.854 \times 10^{-12}$ F·m$^{-1}$), $\eta$ is the dynamic viscosity of the medium, r is the hydrodynamic radius of the ion, q is the charge of the ion, and N is the concentration of the ion. Since increased resistance decreases energy loss and a decrease in ion concentration increases resistance, a reduction in the concentration of ions diffusing through the medium decreases energy loss.

An ion's ability to diffuse through a given medium is influenced by the size of the ion, the charge of the ion, the interaction of the ion with the surrounding medium and the ion's dissociation energy with available counterions. Since not all ions diffuse equally through the given medium, when the medium is a polymer, the diffusivity of the ions generally affects the insulation ability of the polymer. Without intending to be bound by theory, it is believed that polymers produced from the catalyst systems of this disclosure have desirable electrical properties such as decreased electrical loss, because the anions of the ionic metallic activator complex of formula (I) are less able to diffuse through the produced polymer.

Catalyst System Components

The catalyst system may include a procatalyst. The procatalyst may be rendered catalytically active by contacting the complex to, or combining the complex with, a metallic activator having anion of formula (I) and a countercation. The procatalyst may be chosen from a Group IV metal-ligand complex (Group IVB according to CAS or Group 4 according to IUPAC naming conventions), such as a titanium (Ti) metal-ligand complex, a zirconium (Zr) metal-ligand complex, or a hafnium (Hf) metal-ligand complex. Non-limiting examples of the procatalyst include catalysts, procatalysts, or catalytically active compounds for polymerizing ethylene-based polymers are disclosed in one or more of U.S. Pat. No. 8,372,927; WO 2010022228; WO 2011102989; U.S. Pat. Nos. 6,953,764; 6,900,321; WO 2017173080; U.S. Pat. Nos. 7,650,930; 6,777,509 WO 99/41294; U.S. Pat. No. 6,869,904; or WO 2007136496, all of which documents are incorporated herein by reference in their entirety.

In one or more embodiments, the Group IV metal-ligand procatalyst complex includes a bis(phenylphenoxy) Group IV metal-ligand complex or a constrained geometry Group IV metal-ligand complex.

According to some embodiments, the Group IV metal-ligand procatalyst complex may include a bis(phenylphenoxy) structure according to formula (X):

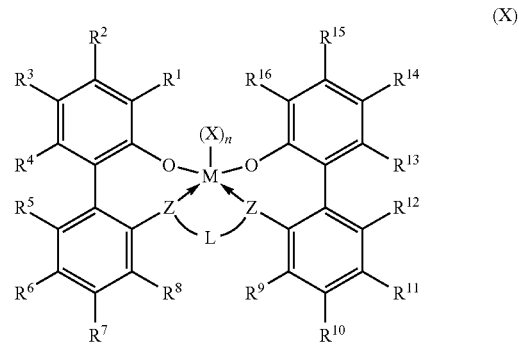

(X)

In formula (X), M is a metal chosen from titanium, zirconium, or hafnium, the metal being in a formal oxidation state of +2, +3, or +4. Subscript n of (X)$_n$ is 0, 1, or 2. When subscript n is 1, X is a monodentate ligand or a bidentate ligand, and when subscript n is 2, each X is a monodentate ligand. L is a diradical selected from the group consisting of (C$_1$-C$_{40}$)hydrocarbylene, (C$_1$-C$_{40}$)heterohydrocarbylene, —Si(R$^C$)$_2$—, —Si(R$^C$)$_2$OSi(R$^C$)$_2$—, —Si(R$^C$)$_2$C(R$^C$)$_2$—, —Si(R$^C$)$_2$Si(R$^C$)$_2$—, —Si(R$^C$)$_2$C(R$^C$)$_2$Si(R$^C$)$_2$—, —C(R$^C$)$_2$Si(R$^C$)$_2$C(R$^C$)$_2$—, —N(R$^N$)C(R$^C$)$_2$—, —N(R$^N$)N(R$^N$)—, —C(R$^C$)$_2$N(R$^N$)C(R$^C$)$_2$—, —Ge(R$^C$)$_2$—, —P(R$^P$)—, —N(R$^N$)—, —O—, —S—, —S(O)—, —S(O)$_2$—, —N=C(R$^C$)—, —C(O)O—, —OC(O)—, —C(O)N(R)—, and —N(R$^C$)C(O)—. Each Z is independently chosen from —O—, —S—, —N(R$^N$)—, or —P(R$^P$)—; R$^2$-R$^4$, R$^5$-R$^8$, R$^9$-R$^{12}$ and R$^{13}$-R$^{15}$ are independently selected from the group consisting of —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, —N=C(R$^C$)$_2$, R$^C$C(O)O—, R$^C$OC(O)—, R$^C$C(O)N(R)—, (R$^C$)$_2$NC(O)—, and halogen. R$^1$ and R$^{16}$ are selected from radicals having formula (XI), radicals having formula (XII), and radicals having formula (XIII)

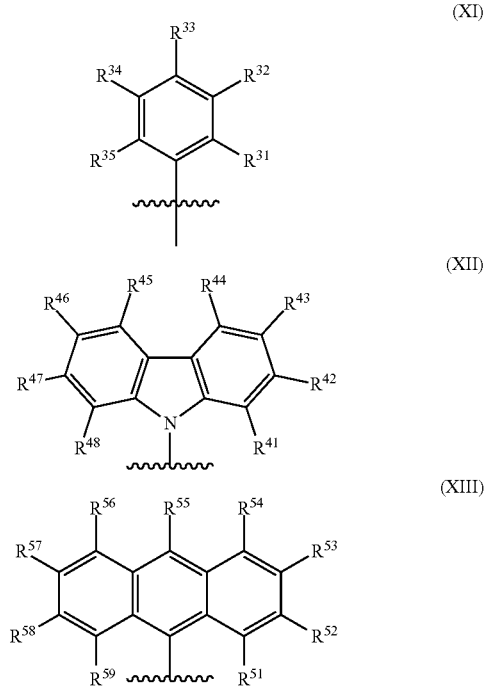

In formulas (XI), (XII), and (XIII), each of R$^{31}$-R$^{35}$, R$^{41}$-R$^{48}$, and R$^{51}$-R$^{59}$ is independently chosen from —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^C$)$_2$NC(O)—, or halogen.

In one or more embodiments, each X can be a monodentate ligand that, independently from any other ligands X, is a halogen, unsubstituted (C$_1$-C$_{20}$)hydrocarbyl, unsubstituted (C$_1$-C$_{20}$)hydrocarbylC(O)O—, or R$^K$R$^L$N—, wherein each of R$^K$ and R$^L$ independently is an unsubstituted(C$_1$-C$_{20}$)hydrocarbyl.

Illustrative bis(phenylphenoxy) metal-ligand complexes according to formula (X) include, for example:

(2',2"-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol)dimethyl-hafnium;

(2',2"-(propane-1,3-diylbis(oxy))bis(3'-chloro-3-(3,6-di-tert-butyl-9-H-carbazol-9-yl)-5'-fluoro-5-(2,4,4-trimethylpentan-2-yl)biphenyl-2-ol)dimethyl-hafnium;

(2',2"-propane-1,3-diylbis(oxy))bis(3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol)dimethyl-hafnium;

(2',2"-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol)dimethyl-hafnium;

(2',2"-(propane-1,3-diylbis(oxy))bis(3-(9H-carbazol-9-yl)-5'-chloro-3'-methyl-5-(2,4,4-timethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol)dimethyl-hafnium;

(2',2"-(2,2-dimethyl-2-silapropane-1,3-diylbis(oxy))bis (3'5'-dichloro-3-(3,6-di-tert-butyl-9H-carbazol-9-yl)-5-(2,4,4-trimethylpentan-2-yl)biphenyl-2-ol)dimethyl-hafnium;

(2',2"-(2,2-dimethyl-2-silapropane-1-diylbis(oxy))bis(5'-chloro-3-(3,6-di-tert-butyl-9-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol)dimethyl-hafnium;

(2',2"-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3",5"-dichloro-3-(3,6-di-tert-butyl-9H-carbazol-9-yl)-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol)dimethyl-hafnium;

(2',2"-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2'2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-zirconium;

(2',2"-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol)dimethyl-titanium; and (2',2"-(propane-1,3-diylbis(oxy))bis(5'-chloro-3-(3,6-di-tert-butyl-9H-carbazol-9-yl)-3'-methyl-5-(2,44-trimethylpentan-2-yl)biphenyl-2-ol)dimethyl-titanium.

Other bis(phenylphenoxy) metal-ligand complexes that may be used in combination with the metallic activators in the catalyst systems of this disclosure will be apparent to those skilled in the art.

According to some embodiments, the Group IV metal-ligand complex may include a cyclopentadienyl procatalyst according to formula (XIV):

Lp$_i$MX$_m$X'$_n$X"$_p$, or a dimer thereof (XIV).

In formula (XIV), Lp is an anionic, delocalized, π-bonded group that is bound to M, containing up to 50 non-hydrogen atoms. In some embodiments of formula (XIV), two Lp groups may be joined together forming a bridged structure, and further optionally one Lp may be bound to X.

In formula (XIV), M is a metal of Group 4 of the Periodic Table of the Elements in the +2, +3 or +4 formal oxidation state. X is an optional, divalent substituent of up to 50 non-hydrogen atoms that together with Lp forms a metallocycle with M. X' is an optional neutral ligand having up to 20 non hydrogen atoms; each X" is independently a monovalent, anionic moiety having up to 40 non-hydrogen atoms. Optionally, two X" groups may be covalently bound together forming a divalent dianionic moiety having both valences bound to M, or, optionally two X" groups may be covalently bound together to form a neutral, conjugated or nonconjugated diene that is π-bonded to M, in which M is in the +2 oxidation state. In other embodiments, one or more X" and one or more X' groups may be bonded together thereby forming a moiety that is both covalently bound to M and coordinated thereto by means of Lewis base functionality. Subscript i of Lp$_i$ is 0, 1, or 2; subscript n of X'$_n$ is 0, 1, 2, or 3; subscript m of X$_m$ is 0 or 1; and subscript p of X"$_p$ is 0, 1, 2, or 3. The sum of i+m+p is equal to the formula oxidation state of M.

Illustrative Group IV metal-ligand complexes may include cyclopentadienyl procatalyst that may be employed in the practice of the present invention include:
cyclopentadienyltitaniumtrimethyl;
cyclopentadienyltitaniumtriethyl;
cyclopentadienyltitaniumtriisopropyl;
cyclopentadienyltitaniumtriphenyl;
cyclopentadienyltitaniumtribenzyl;
cyclopentadienyltitanium-2,4-dimethylpentadienyl;
cyclopentadienyltitanium-2,4-dimethylpentadienyl•triethylphosphine;
cyclopentadienyltitanium-2,4-dimethylpentadienyl•trimethylphosphine;
cyclopentadienyltitaniumdimethylmethoxide;
cyclopentadienyltitaniumdimethylchloride;
pentamethylcyclopentadienyltitaniumtrimethyl;
indenyltitaniumtrimethyl;
indenyltitaniumtriethyl;
indenyltitaniumtripropyl;
indenyltitaniumtriphenyl;
tetrahydroindenyltitaniumtribenzyl;
pentamethylcyclopentadienyltitaniumtriisopropyl;
pentamethylcyclopentadienyltitaniumtribenzyl;
pentamethylcyclopentadienyltitaniumdimethylmethoxide;
pentamethylcyclopentadienyltitaniumdimethylchloride;
bis(η$^5$-2,4-dimethylpentadienyl)titanium;
bis(η$^5$-2,4-dimethylpentadienyl)titanium•trimethylphosphine;
bis(η$^5$-2,4-dimethylpentadienyl)titanium•triethylphosphine;
octahydrofluorenyltitaniumtrimethyl;
tetrahydroindenyltitaniumtrimethyl;
tetrahydrofluorenyltitaniumtrimethyl;
(tert-butylamido)(1,1-dimethyl-2,3,4,9,10-η-1,4,5,6,7,8-hexahydronaphthalenyl)dimethylsilanetitaniumdimethyl;
(tert-butylamido)(1,1,2,3-tetramethyl-2,3,4,9,10-η-1,4,5,6,7,8-hexahydronaphthalenyl)dimethylsilanetitaniumdimethyl;
(tert-butylamido)(tetramethyl-η$^5$-cyclopentadienyl)dimethylsilanetitanium dibenzyl;
(tert-butylamido)(tetramethyl-η$^5$-cyclopentadienyl)dimethylsilanetitanium dimethyl;
(tert-butylamido)(tetramethyl-η$^5$-cyclopentadienyl)-1,2-ethanediyltitanium dimethyl;
(tert-butylamido)(tetramethyl-η$^5$-indenyl)dimethylsilanetitanium dimethyl;
(tert-butylamido)(tetramethyl-η$^5$-cyclopentadienyl)dimethylsilane titanium (III) 2-(dimethylamino)benzyl;
(tert-butylamido)(tetramethyl-η$^5$-cyclopentadienyl)dimethylsilanetitanium (III) allyl;
(tert-butylamido)(tetramethyl-η$^5$-cyclopentadienyl)dimethylsilanetitanium (III) 2,4-dimethylpentadienyl;
(tert-butylamido)(tetramethyl-η$^5$-cyclopentadienyl)dimethylsilanetitanium (II) 1,4-diphenyl-1,3-butadiene;
(tert-butylamido)(tetramethyl-η$^5$-cyclopentadienyl)dimethylsilanetitanium (II) 1,3-pentadiene;
(tert-butylamido)(2-methylindenyl)dimethylsilanetitanium (II) 1,4-diphenyl-1,3-butadiene;
(tert-butylamido)(2-methylindenyl)dimethylsilanetitanium (II) 2,4-hexadiene;
(tert-butylamido)(2-methylindenyl)dimethylsilanetitanium (IV) 2,3-dimethyl-1,3-butadiene;
(tert-butylamido)(2-methylindenyl)dimethylsilanetitanium (IV) isoprene;
(tert-butylamido)(2-methylindenyl)dimethylsilanetitanium (IV) 1,3-butadiene;
(tert-butylamido)(2,3-dimethylindenyl)dimethylsilanetitanium (IV) 2,3-dimethyl-1,3-butadiene;
(tert-butylamido)(2,3-dimethylindenyl)dimethylsilanetitanium (IV) isoprene;
(tert-butylamido)(2,3-dimethylindenyl)dimethylsilanetitanium (IV) dimethyl;
(tert-butylamido)(2,3-dimethylindenyl)dimethylsilanetitanium (IV) dibenzyl;
(tert-butylamido)(2,3-dimethylindenyl)dimethylsilanetitanium (IV) 1,3-butadiene;
(tert-butylamido)(2,3-dimethylindenyl)dimethylsilanetitanium (II) 1,3-pentadiene;

(tert-butylamido)(2,3-dimethylindenyl)dimethylsilanetitanium (II) 1,4-diphenyl-1,3-butadiene;
(tert-butylamido)(2-methylindenyl)dimethylsilanetitanium (II) 1,3-pentadiene;
(tert-butylamido)(2-methylindenyl)dimethylsilanetitanium (IV) dimethyl;
(tert-butylamido)(2-methylindenyl)dimethylsilanetitanium (IV) dibenzyl;
(tert-butylamido)(2-methyl-4-phenylindenyl)dimethylsilanetitanium (II) 1,4-diphenyl-1,3-butadiene;
(tert-butylamido)(2-methyl-4-phenylindenyl)dimethylsilanetitanium (II) 1,3-pentadiene;
(tert-butylamido)(2-methyl-4-phenylindenyl)dimethylsilanetitanium (II) 2,4-hexadiene;
(tert-butylamido)(tetramethyl-$\eta^5$-cyclopentadienyl)dimethyl-silanetitanium (IV) 1,3-butadiene;
(tert-butylamido)(tetramethyl-$\eta^5$-cyclopentadienyl)dimethylsilanetitanium (IV) 2,3-dimethyl-1,3-butadiene;
(tert-butylamido)(tetramethyl-$\eta^5$-cyclopentadienyl)dimethylsilanetitanium (IV) isoprene;
(tert-butylamido)(tetramethyl-$\eta^5$-cyclopentadienyl)dimethyl-silanetitanium (II) 1,4-dibenzyl-1,3-butadiene;
(tert-butylamido)(tetramethyl-$\eta^5$-cyclopentadienyl)dimethylsilanetitanium (II) 2,4-hexadiene;
(tert-butylamido)(tetramethyl-$\eta^5$-cyclopentadienyl)dimethyl-silanetitanium (II) 3-methyl-1,3-pentadiene;
(tert-butylamido)(2,4-dimethylpentadien-3-yl)dimethylsilanetitaniumdimethyl;
(tert-butylamido)(6,6-dimethylcyclohexadienyl)dimethylsilanetitaniumdimethyl;
(tert-butylamido)(1,1-dimethyl-2,3,4,9,10-$\eta$-1,4,5,6,7,8-hexahydronaphthalen-4-yl)dimethylsilanetitaniumdimethyl;
(tert-butylamido)(1,1,2,3-tetramethyl-2,3,4,9,10-$\eta$-1,4,5,6,7,8-hexahydronaphthalen-4-yl)dimethylsilanetitaniumdimethyl;
(tert-butylamido)(tetramethyl-$\eta^5$-cyclopentadienyl methylphenylsilanetitanium (IV) dimethyl;
(tert-butylamido)(tetramethyl-$\eta^5$-cyclopentadienyl methylphenylsilanetitanium (II) 1,4-diphenyl-1,3-butadiene;
1-(tert-butylamido)-2-(tetramethyl-$\eta^5$-cyclopentadienyl) ethanediyltitanium (IV) dimethyl;
1-(tert-butylamido)-2-(tetramethyl-$\eta^5$-cyclopentadienyl) ethanediyl-titanium (II) 1,4-diphenyl-1,3-butadiene;

Each of the illustrative cyclopentadienyl procatalyst may include zirconium or hafnium in place of the titanium metal centers of the cyclopentadienyl procatalyst.

Other procatalysts, especially procatalysts containing other Group IV metal-ligand complexes, will be apparent to those skilled in the art.

The catalyst systems of this disclosure may include co-catalysts or activators in addition to the ionic metallic activator complex having the anion of formula (I) and a countercation. Such additional co-catalysts may include, for example, tri(hydrocarbyl)aluminum compounds having from 1 to 10 carbons in each hydrocarbyl group, an oligomeric or polymeric alumoxane compound, di(hydrocarbyl)(hydrocarbyloxy)aluminums compound having from 1 to 20 carbons in each hydrocarbyl or hydrocarbyloxy group, or mixtures of the foregoing compounds. These aluminum compounds are usefully employed for their beneficial ability to scavenge impurities such as oxygen, water, and aldehydes from the polymerization mixture.

The di(hydrocarbyl)(hydrocarbyloxy)aluminum compounds that may be used in conjunction with the activators described in this disclosure correspond to the formula $T^1_2AlOT^2$ or $T^1_1Al(OT^2)_2$ wherein $T^1$ is a secondary or tertiary $(C_3-C_6)$alkyl, such as isopropyl, isobutyl or tert-butyl; and $T^2$ is a alkyl substituted $(C_6-C_{30})$aryl radical or aryl substituted $(C_1-C_{30})$alkyl radical, such as 2,6-di(tert-butyl)-4-methylphenyl, 2,6-di(tert-butyl)-4-methylphenyl, 2,6-di(tert-butyl)-4-methyltolyl, or 4-(3',5'-di-tert-butyltolyl)-2,6-di-tert-butylphenyl.

Additional examples of aluminum compounds include $[C_6]$trialkyl aluminum compounds, especially those wherein the alkyl groups are ethyl, propyl, isopropyl, n-butyl, isobutyl, pentyl, neopentyl, or isopentyl, dialkyl(aryloxy) aluminum compounds containing from 1-6 carbons in the alkyl group and from 6 to 18 carbons in the aryl group (especially (3,5-di(t-butyl)-4-methylphenoxy)diisobutylaluminum), methylalumoxane, modified methylalumoxane and diisobutylalumoxane.

In the catalyst systems according to embodiments of this disclosure, the molar ratio of the ionic metallic activator complex to Group IV metal-ligand complex may be from 1:10,000 to 1000:1, such as, for example, from 1:5000 to 100:1, from 1:100 to 100:1 from 1:10 to 10:1, from 1:5 to 1:1, or from 1.25:1 to 1:1. The catalyst systems may include combinations of one or more ionic metallic activator complexes described in this disclosure.

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, 4-methyl-1-pentene, 5-ethylidene-2-norbornene, and 5-vinyl-2-norbornene. For example, the one or more α-olefin co-monomers may be selected from the group consisting of propylene, 1-butene, 1-hexene, and 1-octene; or in the alternative, from the group consisting of 1-hexene and 1-octene.

Ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mol %" are disclosed herein as separate embodiments; for example, the ethylene-based polymers, homopolymers and/or interpolymers (including copolymers) of ethylene and optionally one or more co-monomers such as α-olefins may comprise at least 60 mol % monomer units derived from ethylene; at least 70 mol % monomer units derived from ethylene; at least 80 mol % monomer units derived from ethylene; or from 50 to 100 mol % monomer units derived from ethylene; or from 80 to 100 mol % units derived from ethylene.

In some embodiments, the ethylene-based polymers may comprise at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene-based polymer, the ethylene-based polymers may comprise an amount of ($C_3$-$C_{20}$)α-olefin. The amount of ($C_3$-$C_{20}$)α-olefin is less than 50 mol %. In some embodiments, the ethylene-based polymer may include at least 0.5 mol % to 25 mol % of ($C_3$-$C_{20}$)α-olefin; and in further embodiments, the ethylene-based polymer may include at least 5 mol % to 10 mol %. In some embodiments, the additional α-olefin is 1-octene.

Any conventional polymerization process, in combination with a catalyst system according to embodiments of this disclosure may be used to produce the ethylene-based polymers. Such conventional polymerization processes include, but are not limited to, solution polymerization processes, gas-phase polymerization processes, slurry-phase polymerization processes, and combinations thereof using one or more conventional reactors such as loop reactors, isothermal reactors, fluidized-bed gas-phase reactors, stirred-tank reactors, batch reactors in parallel, series, or any combinations thereof, for example.

In one embodiment, ethylene-based polymer may be produced via solution polymerization in a dual reactor system, for example a dual-loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual-loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual-loop reactor system, wherein ethylene and optionally, one or more α-olefins are polymerized in the presence of the catalyst system, as described herein, in both reactors.

In another embodiment, the ethylene-based polymer may be produced via solution polymerization in a single reactor system, for example a single-loop reactor system, in which ethylene and optionally one or more α-olefins are polymerized in the presence of the catalyst system, as described within this disclosure.

The polymer process may further include incorporating one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may comprise from about 0 to about 10 percent by weight of the total amount of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex and an ionic metallic activator complex and, optionally a scavenger. The polymer resulting from such a catalyst system that incorporates the metal-ligand complex and the ionic metallic activator complex may have a density according to ASTM D792 (incorporated herein by reference in its entirety) from 0.850 g/cm$^3$ to 0.950 g/cm$^3$, from 0.870 g/cm$^3$ to 0.920 g/cm$^3$, from 0.870 g/cm$^3$ to 0.910 g/cm$^3$, or from 0.870 g/cm$^3$ to 0.900 g/cm$^3$, for example.

In another embodiment, the polymer resulting from the catalyst system that includes the metal-ligand complex and an ionic metallic activator complex has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex and the ionic metallic activator complex has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Batch Reactor Procedure

Batch reactor experiments are performed in a 1-gallon continuous stirred tank reactor. The reactor is loaded with Isopar-E hydrocarbon solvents, hydrogen and the appropriate amount of octene comonomer before being heated to the specified temperature and pressurized with ethylene to 450 psi. When the reactor is at pressure the polymerization is initiated by adding a catalyst cocktail comprising the procatalyst, ionic metallic activator complex, solvent, and triethylaluminum scavenger. Polymerization is allowed to proceed for 10 minutes while maintaining reactor temperature and pressure. After the reaction is completed the polymer is collected and dried in a vacuum oven overnight before being analyzed.

Polyoctene Screening Procedure

Neat 1-octene (11 mL) is added to a 40-mL vial equipped with a stir bar. The vial is placed in a polyurethane insulating block that itself is placed on a magnetic stir plate. The activator is added to the stirring solution. A solution of the procatalyst is added to the stirring solution. The vial is immediately capped with a septum screw-cap lid and a thermometer probe is inserted into the vial such that the probe tip is submerged in the 1-octene solution. The thermometer probe is connected to a digital recorder to record the time and temperature at 5-second intervals. The solution in the vial is continually stirred and is monitored for 10 minutes.

Continuous Polymerization

Raw materials (ethylene, 1-octene) and the process solvent (a narrow-boiling-range high-purity isoparaffinic solvent trademarked ISOPAR E commercially available from ExxonMobil Corporation) are purified with molecular sieves before introduction into the reaction environment. Hydrogen is supplied in pressurized cylinders as a high-purity grade and further purification is not required. The reactor monomer feed (ethylene) stream is pressurized via mechanical compressor to above reaction pressure at 525 psig. The solvent and comonomer (1-octene) feed is pressurized via mechanical positive-displacement pump to above reaction pressure at 525 psig. Triethylaluminum, commercially available from AkzoNobel, is used as an impurity scavenger. The individual catalyst components (procatalyst/activator/scavenger) are manually batch-diluted to specified component concentrations with purified solvent (Isopar E) and pressured to above reaction pressure at 525 psig. The activator is used at a 1.2 molar ratio relative to the procatalyst. All reaction feed flows are measured with mass-flow meters and independently controlled with computer-automated valve-control systems.

The continuous solution polymerizations are carried out in a 1-gallon continuously stirred-tank reactor (CSTR). The combined solvent, monomer, comonomer, and hydrogen feed to the reactor is temperature controlled between 5° C. and 30° C. and is typically 15° C. All of these materials are fed to the polymerization reactor with the solvent feed. The catalyst is fed to the reactor to reach a specified conversion of ethylene. The activator is fed separately based on a calculated specified molar ratio (1.2 molar equivalents) to the catalyst component. The TEA scavenger shares the same line as the activator and flow is based on either an Al concentration in the reactor or a specified molar ratio to the catalyst component. The effluent from the polymerization reactor (containing solvent, monomer, comonomer, hydrogen, catalyst components, and molten polymer) exits in the reactor. When the effluent is contacted with water, the polymerization is terminated. In addition, various additives such as antioxidants can be added at this point. The stream then goes through a static mixer to evenly disperse the catalyst kill and additives.

Following additive addition, the effluent passes through a heat exchanger to raise the stream temperature in preparation for separation of the polymer from the other lower-boiling reaction components. The stream passes through the reactor pressure control valve, across which the pressure is greatly reduced. From there, the effluent enters a two-stage separation system consisting of a devolatizer and a vacuum extruder, where solvent and unreacted hydrogen, monomer, comonomer, and water are removed from the polymer. The strand of molten polymer formed exits the extruder and is submerged in a cold-water bath, where it solidifies. The strand is then fed through a strand chopper, where the polymer is cut into pellets after being air-dried.

EXAMPLES

Example 1 is the synthetic procedure for Activator 1, and Example 2 is the synthetic procedure for Activator 8. In Example 3, various activators were used to synthesize polymer resins. The polymer resin characteristics were measured and recorded in Tables 1-3. One or more features of the present disclosure are illustrated in view of the examples as follows:

Example 1: Synthesis of Activator 1

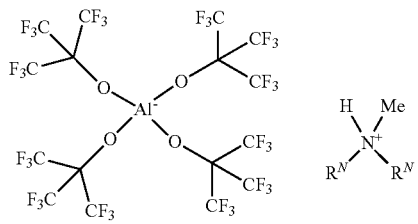

A solution of nonafluoro-tert-butanol (7.0 g, 30 mmol) in toluene (100 mL) and ARMEEN M2HT, a di(hydrogenated tallow alkyl)(methyl)amine available from Akzo-Nobel, (3.6 g, 6.7 mmol) was placed in the freezer at −35° C. In a separate vial a trimethylaluminum solution in hexane (6.7 mL, 1 M, 6.7 mmol) in toluene (100 mL) was also placed in the freezer. The trimethylaluminum solution was slowly added to the nonafluoro-tert-butanol solution. About halfway through the addition the two vials were placed back in the glovebox freezer and were allowed to cool again for 30 minutes. The addition was continued until all the aluminum was added. The combined solution was then stirred while warming to room temperature over 30 minutes and continued stirring overnight. The volatiles were then removed under vacuum and the remaining residue was used without further purification to provide a 7.8 g of the activator, a 77% yield.

$^{19}$F NMR (376 MHz, CDCl$_3$) δ−75.71.

Example 2: Synthesis of Activator 8

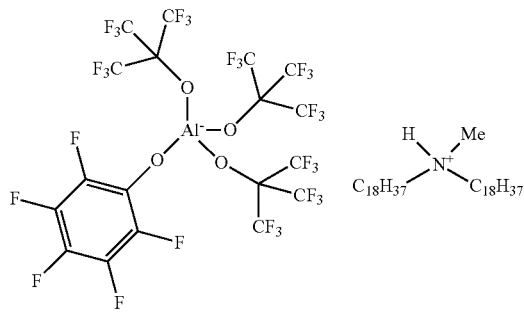

Nonafluoro-tert-butanol (5.0 g, 21 mmol) was weighed into a small vial and was dissolved in fluorobenzene (25 mL). In a separate vial was weighed AlMe₃ (0.51 g, 7.1 mmol) which was also dissolved in fluorobenzene (25 mL). Both vials were placed in the freezer (−35° C.) for 30 min. The solution of AlMe₃ was slowly added to the solution of nonafluoro-tert-butanol, and then placed in the freezer for 3 hours. During this time a solution of pentafluorophenol (1.3 g, 7.1 mmol) in fluorobenzene (25 mL) and a solution of ARMEEN M2HT (3.8 g, 7.1 mmol) in fluorobenzene (25 mL) were prepared. The pentafluorophenol solution was added slowly to the cooled reaction mixture. After 3 minutes the ARMEEN M2HT solution was then added. The reaction was allowed to warm to room temperature and was then stirred for 72 h. The resulting light yellow solution was placed under vacuum to remove the volatiles to yield the product (8.6 g, 84%).

Example 3—Polymerization Results

The polymerizations were carried out in a batch reactor according to the procedure previously described. The co-catalytic efficiency and resulting polymer characteristics were assessed for Activators 1, 5-9, each having an anionic structure according to formula (I) and a bis(phenylphenoxy) Group IV metal-ligand complex.

Each of the metallic Activators 1-7 was intermixed with Procatalyst A to form a catalyst system. Comparative Activator C1 (herein "Comparative C1") was intermixed with Procatalyst A to form a comparative catalyst system. Comparative C1 had ⁺NH(Me)(C₁₈H₃₇)₂ as a countercation.

Procatalyst A

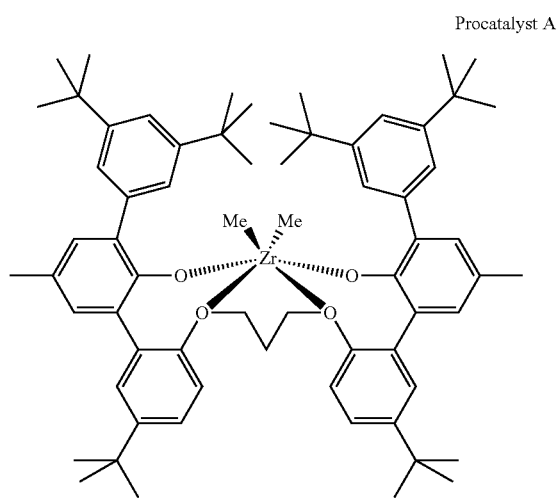

Comparative C1

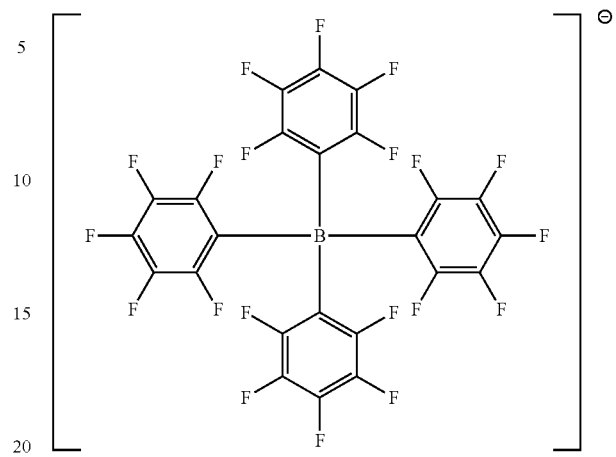

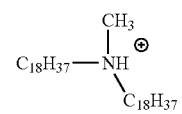

The efficiencies of the inventive Activators 1-7 and Comparative Activator C1 (herein "Comparative C1") and the polymer characteristics of the polymers yielded from the inventive Activators 1-7 and Comparative C1 were determined. The results are summarized in Tables 1 and 2. The Comparative C1 has been successfully used in industrial applications.

TABLE 1

| Polyoctene Results | | |
|---|---|---|
| Activator (µmol) | Procatalyst (µmol) | Max Temp. (° C.) |
| Comparative C1 (2.5) | A (2.0) | 96 |
| Activator 5 (2.5) | A (2.0) | 99 |
| Activator 7 (2.5) | A (2.0) | 80 |
| Activator 3 (2.5) | A (2.0) | 70 |

The results in Table 1 indicate that the Activators 3, 5, and 7 were capable of activating Procatalyst A and producing a polyoctene homopolymer. The "Max Temp," in Table 1 was the maximum adiabatic temperature in degrees Celsius in the reactor. Increased adiabatic temperatures would indicate an increase amount of polymer produced.

The data in Table 2 were obtained at 140° C. polymerization temperature, and the data in Table 3 were obtained at 190° C.

TABLE 2

Batch Reactor Results at 140° C.

| Activator | Temp. (° C.) | Efficiency* | $M_n$ | $M_w$ | PDI |
|---|---|---|---|---|---|
| Comparative C1 | 140 | 1,428,351 | 85,591 | 173,696 | 2.03 |
| Activator 1 | 140 | 691,614 | 102,889 | 200,405 | 1.95 |
| Activator 6 | 140 | 359,925 | 107,538 | 214,778 | 2.00 |
| Activator 4 | 140 | 4,374 | — | — | — |
| Activator 3 | 140 | 208,811 | 115797 | 236150 | 2.04 |

Batch reactor conditions for Tables 2 and 3: 1.47 kg of Isopar™ E; 100 grams of octene, 410 psi of ethylene; activator:procatalyst ratio was approximately 1.2; MMAO-3A was used as an impurity scavenger at a MMAO-3A:procatalyst mole ratio of approximately 50.

TABLE 3

Batch Reactor Results at 190° C.

| Activator | Temp. (° C.) | Efficiency* | $M_n$ | $M_w$ | PDI |
|---|---|---|---|---|---|
| Comparative C1 | 190 | 761,847 | 37,591 | 72,012 | 1.92 |
| Activator 1 | 190 | 1,224,315 | 42,227 | 86,922 | 2.01 |
| Activator 6 | 190 | 117,744 | 41,859 | 80,784 | 1.93 |
| Activator 3 | 190 | 129,375 | 42031 | 78,791 | 1.88 |

*Efficiency is defined in units of grams of polymer per gram of active metal (Hf or Zr).

Electrical Testing Conditions

TABLE 4

Results from Electrical Experiments Conducted with the Squalene Test

| Activator | Dissipation Factor in solution, no water (60 Hz) | Dissipation Factor in solution, with water (60 Hz) |
|---|---|---|
| Comparative C1 | 0.28544 | 0.2828 |
| Activator 1 | 0.10013 | 0.02257 |

The Hydrocarbon Conductivity Test, as described in this disclosure, simulates the post-polymerization process when the produced polymer resins are washed with water to remove the catalyst and co-catalyst residue. The results summarized in Table 8 indicate that the Activator 1 has a lower dissipation factor than the $^-B(C_6F_5)_4$ anion present in Comparative C1, and therefore, indicates that polymers produced from Activator 1 are superior to polymers produced from Comparative C1 with regard to their electrical properties.

Based on the results summarized in Table 4, it is believed that the water interacts with the inventive Activators to reduce the contribution of the Activators to the electrical properties. It is believed, without desiring to be bound by such belief, that the water chemically reacts with the activator to form degradation products that do not significantly contribute to charge transport, thereby causing the polymers produced by the inventive activators to exhibit low conductivity. However, it is believed that Comparative C1 does not react with water under the conditions of the HC Test. Since Comparative C1 consists of ionic species—anions and cations—it contributes to ionic charge transport both before and after water addition.

As previously described, the hydrocarbon solution in the HC Test is heated to remove water. It is believed, without desiring to be bound by such belief, that the water, antioxidant, and/or heat of the water-removal process degrade the inventive activators, resulting in the formation of degradation products that do not significantly contribute to charge transport. It is assumed that Comparative C1 does not significantly degrade under the polymerization conditions, and that, as an ionic species, Comparative C1 contributes to ionic charge transport in the elastomer. Since the inventive activators result in the formation of degradation products that do not significantly contribute to charge transport, the inventive activators are able to produce insulting polymers.

In the FIGURE, the TGIC spectrum for resins generated from activators of the present invention demonstrated that Activators 1 and 8 produce polymer resins with narrow, monomodal composition distributions similar to those achieved by the $^-B(C_6F_5)_4$ anion present in Comparative C1. This stands in contrast to Comparative C2, which shows a broad, bimodal composition distribution and leads to sticky pellets. Additionally, the results summarized in Table 4 indicate that the Activator 1 has a better dissipation factor than the $^-B(C_6F_5)_4$ anion present in Comparative C1.

High Comonomer Content (HCC) Method by TGIC

A commercial Crystallization Elution Fractionation instrument (CEF) (Polymer Char, Spain) was used to perform the high temperature thermal gradient interaction chromatography (TGIC) measurement (Cong, et al., Macromolecules, 2011, 44 (8), 3062-3072). A HYPERCARB column (100×4.6 mm, Part #35005-104646, Thermo Scientific) was used for separation. A "8 cm×0.48 cm (3/16 inch ID)" stainless steel column packed with 27-micron glass beads (Catalog #GL01918/20-27 um, MO-SCI Specialty Products, LLC, Rolla, Mo., USA), was installed in front of the IR detector, in the top oven of the CEF instrument. The experimental parameters are as follows: a top oven/transfer line/needle temperature at 150° C., a dissolution temperature at 160° C., a dissolution stirring setting at 2, a sample loading volume of 0.400 mL, a pump stabilization time of 15 seconds, a pump flow rate of cleaning column at 0.500 mL/m, a pump flow rate of column loading at 0.300 mL/min, a stabilization temperature at 150° C., a stabilization time (pre, prior to load to column) at 3.0 min, a stabilization time (post, after loaded to column) at 1.0 min, a SF (Soluble Fraction) time at 3.0 min, a cooling rate of 3.00° C./min from 150° C. to 30° C., a flow rate during the cooling process of 0.01 mL/min, heating rate of 2.00° C./min from 30° C. to 160° C., an isothermal time at 160° C. for 10 min, an elution flow rate of 0.500 mL/min, and injection loop size of 140 microliters.

Samples were prepared by the PolymerChar autosampler at 160° C., for 60 minutes, at a concentration of 4.0 mg/mL in ODCB. Prior to use, silica gel 40 (particle size 0.2~0.5 mm, catalogue number 10181-3, EMD) was dried in a vacuum oven at 160° C., for about two hours. An amount of 2,5-di-tert-butyl-4-methylphenol (1.6 grams, BHT, catalogue number B1378-500G, Sigma-Aldrich) and silica gel (5.0 grams) were added to two liters of ortho-dichlorobenzene (ODCB, 99% anhydrous grade, Sigma-Aldrich), creating an ODCB solution. The ODCB solution was purged with dried nitrogen ($N_2$) for one hour prior to use.

The TGIC data was processed on a PolymerChar (Spain) "GPC One" software platform. The temperature calibration was performed with a mixture of about 4 to 6 mg of eicosane, 14.0 mg of isotactic homopolymer polypropylene iPP (polydispersity of 3.6 to 4.0, and molecular weight (Mw) reported as polyethylene equivalent of 150,000 to 190,000, and polydispersity (Mw/Mn) of 3.6 to 4.0), and 14.0 mg of homopolymer polyethylene HDPE (zero comonomer content, Mw reported as polyethylene equivalent as 115,000 to 125,000, and polydispersity of 2.5 to 2.8), in a 10 mL vial filled with 7.0 mL of ODCB. The dissolution time was 2 hours at 160° C.

The calibration process (30° C. to 150° C. for eicosane elution and HDPE elution) included the following steps: (1) the eluting temperature was extrapolated for each of the isothermal steps during elution according to heating rate (demonstrated in the FIGURE). (2) The delay volume was calculated, and the temperature (x-axis) was shifted corresponding to the IR measurement channel chromatogram (y-axis), so that the eicosane peak (y-axis) is coincident with elution temperature at 30.0° C. The delay volume is calculated from the temperature difference (30° C.—the actual elution temperature of the eicosane peak) divided by heating rate of the method, and then multiplied by elution flow rate. (3) Each recorded elution temperature was adjusted with this same delay volume adjustment. (4) The heating rate was linearly scaled, so that the HDPE reference has an elution peak temperature of 150.0° C., while maintaining an eicosane elution peak temperature of 30.0° C. Finally, (5) the peak temperature of the polypropylene was observed to be from 119.3 to 120.2° C., which is a validation of the calibration method.

Data Processing for Polymer Samples of TGIC

A solvent blank (pure solvent injection) was run under the same experimental conditions as the polymer samples. Data processing for polymer samples includes: subtraction of the solvent blank for each detector channel, temperature extrapolation, as described in the calibration process, compensation of temperature with the delay volume, determined from the calibration process, and adjustment in elution temperature axis to the 30° C. and 160° C. range, as calculated from the heating rate of the calibration.

The chromatogram was integrated with PolymerChar "GPC One" software. A straight baseline was drawn from the visible difference, when the peak falls to a flat baseline (roughly a zero value in the blank subtracted chromatogram) at high elution temperature and the minimum or flat region of detector signal on the high temperature side of the soluble fraction (SF).

The upper temperature integration limit was established, based on the visible difference when the peak falls to the flat baseline region (roughly a zero value in the blank subtracted chromatogram). The lower temperature integration limit was established, based on the intersection point of baseline with the chromatogram including the soluble fraction.

The "High Comonomer Content (HCC)" is defined as the weight percentage of the material eluting at a temperature less than or equal to 65.0° C. The HCC was calculated by integrating the IR measurement channel, at temperatures less than, and including, 65.0° C., and dividing this value by the total integration of the IR measurement channel.

The invention claimed is:

1. A process of polymerizing olefins, the process comprising contacting ethylene and a ($C_3$-$C_{40}$)alpha-olefin comonomer in the presence of a catalyst system to produce an ethylene-based polymer, the catalyst system comprising a procatalyst and an ionic metallic activator complex, the ionic metallic activator complex comprising an anion and a countercation, the anion having a structure according to formula (I):

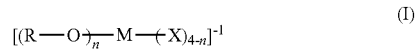

where:
M is aluminum, boron, or gallium;
n is 3 or 4;
each R is independently selected from the group consisting of radicals having formula (II) and radicals having formula (III):

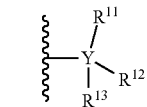

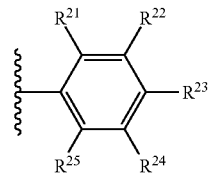

each Y is independently carbon or silicon;
each $R^{11}$, $R^{12}$, $R^{13}$, $R^{21}$, $R^{22}$, $R^{23}$, $R^{24}$, and $R^{25}$ is independently chosen from ($C_1$-$C_{40}$)alkyl, ($C_6$-$C_{40}$)aryl, —$OR^C$, —$SR^C$, —H, or —F, wherein when R is a radical according to formula (III), at least one of $R^{21}$, $R^{22}$, $R^{23}$, $R^{24}$, or $R^{25}$ is a halogen-substituted ($C_1$-$C_{40}$)alkyl, a halogen-substituted ($C_6$-$C_{40}$)aryl, or —F; and provided that:
when each R is a radical according to formula (II) and Y is carbon, at least one of $R^{11}$, $R^{12}$, or $R^{13}$ is a halogen-substituted ($C_1$-$C_{40}$)alkyl, a halogen-substituted ($C_6$-$C_{40}$)aryl, or —F; and
when M is aluminum and n is 4 and each R is a radical according to formula (II), and each Y is carbon:
each $R^{11}$, $R^{12}$, and $R^{13}$ of each R is a halogen-substituted ($C_1$-$C_{40}$)alkyl, a halogen-substituted ($C_6$-$C_{40}$)aryl, or —F; or
at least one of $R^{11}$, $R^{12}$, or $R^{13}$ is —H and a total number of halogen atoms in $R^{11}$, $R^{12}$, and $R^{13}$ of each R is at least six;

each X is a monodentate ligand independently chosen from halogen-substituted $(C_1-C_{20})$alkyl, $(C_1-C_{20})$alkyl, halogen-substituted $(C_6-C_{40})$aryl, $(C_6-C_{40})$aryl, triflate, or $—S(O)_3R^C$;

optionally, two groups R in formula (I) are covalently connected;

each $R^C$ is independently $(C_1-C_{30})$hydrocarbyl or —H; wherein when n is 4, no more than one R is a radical having formula (III); and the countercation is $^+N(H)R^N_3$, where each $R^N$ is chosen from $(C_1-C_{20})$alkyl or $(C_6-C_{20})$aryl, $^+C(C_6H_5)_3$; or $^+C(C_6H_4R^C)_3$, where $R^C$ is $(C_1-C_{20})$alkyl;

the procatalyst is selected from the group consisting of Group IV metal-ligand complexes (Group IVB according to CAS or Group 4 according to IUPAC naming conventions.

2. The process according to claim 1, wherein the procatalyst is a bis(phenylphenoxy) metal-ligand complex.

3. The process according to claim 1, wherein n is 4 and each R is independently $—C(H)(CF_3)_2$, $—C_6F_5$, or $—C(CF_3)_3$.

4. The process according to claim 1, wherein n is 3 and X is chosen from, triflate (—OTf), methyl, or halogen.

5. The process according to claim 1, wherein n is 4, and three of four groups R are $—C(CF_3)_3$ and one of four groups R is $—C_6F_5$.

6. The process according to claim 1, wherein the countercation is $^+N(H)R^N_3$, where each $R^N$ is chosen from $(C_1-C_{20})$alkyl or $(C_6-C_{20})$aryl.

7. The process according to claim 1, wherein the countercation is $^+N(H)R^N_3$, where each where at least two $R^N$ are chosen from $(C_{10}-C_{20})$alkyl.

8. The process according to claim 1, wherein the countercation is $^+C(C_6H_5)_3$.

9. The process according to claim 1, wherein the countercation is $^+C(C_6H_4R^C)_3$, where $R^C$ is $(C_1-C_{20})$alkyl.

10. The process according to claim 1, wherein two groups R are covalently connected and the anion has a structure according to formula (IV):

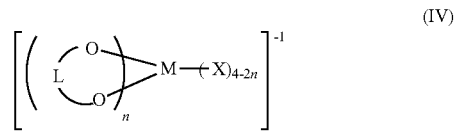

(IV)

where:

M and X are as defined in formula (I);

n is 2;

L represents the two groups R that are covalently connected;

each L is independently chosen from $(C_2-C_{40})$alkylene, $(C_2-C_{40})$heteroalkylene or or $—(Si(R^C)_2—O)_z—Si(R^C)_2—$, where z is 0, 1, 2, or 3; and wherein $R^C$ is independently $(C_1-C_{30})$hydrocarbyl or —H; and when n is 1, X is a monodentate ligand independently chosen from halogen, halogenated-$(C_1-C_{20})$alkyl, or triflate.

11. The process according to claim 1, wherein the ionic metallic activator complex in a high-boiling-point fully saturated hydrocarbon solution having a concentration of 200 micromoles of ionic metallic activator complex and 20 millimoles of water in a high-boiling-point fully saturated hydrocarbon solution has a percent dissipation factor of less than or equal to 0.1 as measured by the Hydrocarbon Conductivity Test.

* * * * *